United States Patent
Li et al.

(10) Patent No.: US 11,474,081 B2
(45) Date of Patent: Oct. 18, 2022

(54) SENSOR MODULE

(71) Applicant: KABUSHIKI KAISHA TOSHIBA, Tokyo (JP)

(72) Inventors: Yongfang Li, Kawasaki Kanagawa (JP); Takahiro Omori, Kawasaki Kanagawa (JP); Takashi Usui, Saitama Saitama (JP); Osamu Nishimura, Kawasaki Kanagawa (JP); Kazuo Watabe, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 135 days.

(21) Appl. No.: 16/556,286

(22) Filed: Aug. 30, 2019

(65) Prior Publication Data
US 2020/0292505 A1  Sep. 17, 2020

(30) Foreign Application Priority Data
Mar. 14, 2019 (JP) .............................. JP2019-047510

(51) Int. Cl.
*G01N 29/42* (2006.01)
*G01N 29/12* (2006.01)
(Continued)

(52) U.S. Cl.
CPC ............. *G01N 29/42* (2013.01); *G01H 11/08* (2013.01); *G01M 13/028* (2013.01); *G01N 29/12* (2013.01)

(58) Field of Classification Search
CPC ........ G01N 29/42; G01N 29/12; G01H 11/08; G01M 13/028
See application file for complete search history.

(56) References Cited

U.S. PATENT DOCUMENTS 4,467,271 A * 8/1984 Ruckenbauer ......... G01R 29/22
324/622
4,618,014 A * 10/1986 Kobayashi ............... G01G 3/16
177/185

(Continued)

FOREIGN PATENT DOCUMENTS

EP  0 849 574 A2  6/1998
JP  H10-157257 A  6/1998
(Continued)

OTHER PUBLICATIONS

Ito, Piezoelectric thin film resonator, 2008, WO2008084578A1, Downloaded from the Espacenet on Jan. 3, 2021 (Year: 2008).*

(Continued)

*Primary Examiner* — Alexander Satanovsky
*Assistant Examiner* — Lyudmila Zaykova-Feldman
(74) *Attorney, Agent, or Firm* — Finnegan, Henderson, Farabow, Garrett & Dunner L.L.P.

(57) ABSTRACT

According to one embodiment, a sensor module includes a sensor and a diagnosis circuit. The sensor includes piezoelectric transducers and switches. The piezoelectric transducers have different resonance frequencies. The switches are provided to correspond to the piezoelectric transducers, respectively. Each of the switches outputs an output signal corresponding to a voltage generated by an inverse piezoelectric effect of a corresponding piezoelectric transducer of the piezoelectric transducers. The diagnosis circuit diagnoses, based on a difference in pattern of the output signal, whether vibration has newly occurred in the sensor, and switch an output destination of the output signal of the sensor according to a result of the diagnosis.

7 Claims, 6 Drawing Sheets

(51) Int. Cl.
*G01H 11/08* (2006.01)
*G01M 13/028* (2019.01)

(56) References Cited

U.S. PATENT DOCUMENTS

| | | | | |
|---|---|---|---|---|
| 5,220,836 | A * | 6/1993 | Harms | G01L 9/08 73/702 |
| 5,801,475 | A * | 9/1998 | Kimura | H01L 41/1136 310/329 |
| 7,006,641 | B1 * | 2/2006 | Saiki | B06B 1/0215 381/98 |
| 8,427,249 | B1 * | 4/2013 | Swanson | H03H 9/02433 331/154 |
| 2007/0040624 | A1 * | 2/2007 | Ostanin | G01N 29/036 331/158 |
| 2008/0083285 | A1 * | 4/2008 | Eguchi | G01L 1/16 73/765 |
| 2010/0327695 | A1 * | 12/2010 | Goel | B06B 1/0611 310/320 |
| 2014/0117812 | A1 * | 5/2014 | Hajati | B06B 1/0629 310/314 |
| 2015/0236610 | A1 * | 8/2015 | Sasaki | G01N 29/223 73/649 |
| 2019/0146036 | A1 * | 5/2019 | Kato | G01R 31/343 702/34 |
| 2019/0360880 | A1 | 11/2019 | Li | |

FOREIGN PATENT DOCUMENTS

| | | | | |
|---|---|---|---|---|
| JP | 2000-74733 A | 3/2000 | | |
| JP | 2008-298527 A | 12/2008 | | |
| JP | 2016-223821 A | 12/2016 | | |
| JP | 2018-190053 A | 11/2018 | | |
| JP | 2019-204918 A | 11/2019 | | |
| WO | WO-2001079794 A1 * | 4/2001 | | G01P 15/09 |
| WO | WO-0179794 A1 * | 10/2001 | | G01H 11/08 |
| WO | WO-2008084578 A1 * | 7/2008 | | H03H 9/02102 |
| WO | WO 2014/050348 A1 | 4/2014 | | |
| WO | WO 2017/217069 A1 | 12/2017 | | |

OTHER PUBLICATIONS

Okada et al., "A digital output accelerometer using an array of patterned PZT thin films electrically connected in series," $23^{rd}$ Proceeding of JIEP Annual Meeting Session ID: 13A-11 (2009), pp. 1-2.

Itoh et al., "A Digital Output Piezoelectric Accelerometer for Ultra-low Power Wireless Sensor Node," IEEE Sensors 2008 Conference (2008), pp. 542-545.

* cited by examiner

SENSOR MODULE

CROSS-REFERENCE TO RELATED APPLICATIONS

This application is based upon and claims the benefit of priority from the Japanese Patent Application No. 2019-047510, filed Mar. 14, 2019, the entire contents of which are incorporated herein by reference.

FIELD

Embodiments described herein relate generally to a sensor module.

BACKGROUND

Many industrial plants such as petrochemical plants and power plants are operated in continuous operation day and night. In equipment management of these plants, it is required to take appropriate countermeasures by detecting abnormalities of moving machines at an early stage. With respect to abnormality types of rotary bodies breaking down at a high failure frequency among machine elements of these moving machines, it is desired that abnormalities occurring in a low frequency band (from several tens Hz to several hundreds Hz) due to unbalance, misalignment, etc. and abnormalities occurring in a high frequency band due to exhaustion of oil or scratches of rolling bearing, shaft damage, gear wear, blade contact, etc. are monitored over a wide frequency band.

DETAILED DESCRIPTION

In general, according to one embodiment, a sensor module includes a sensor and a diagnosis circuit. The sensor includes piezoelectric transducers and switches. The piezoelectric transducers have different resonance frequencies. The switches are provided to correspond to the piezoelectric transducers, respectively. Each of the switches outputs an output signal corresponding to a voltage generated by an inverse piezoelectric effect of a corresponding piezoelectric transducer of the piezoelectric transducers. The diagnosis circuit diagnoses, based on a difference in pattern of the output signal, whether vibration has newly occurred in the sensor, and switch an output destination of the output signal of the sensor according to a result of the diagnosis.

Embodiments will be described hereunder with reference to the drawings.

First Embodiment

Figure 1:
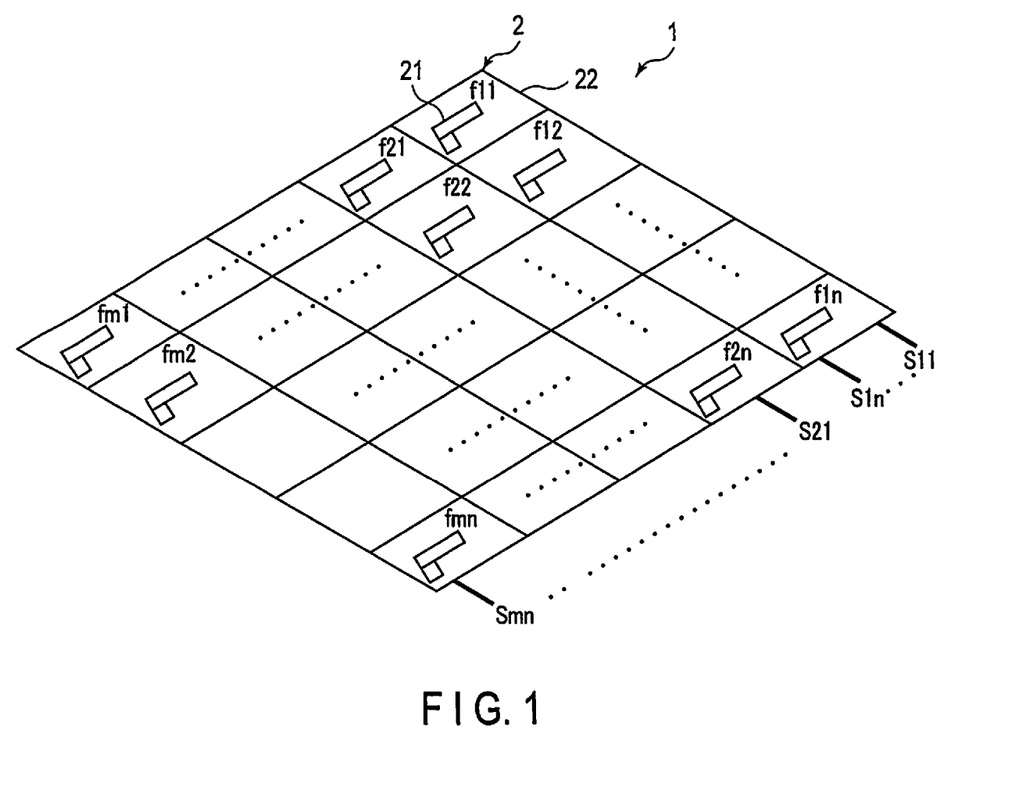
FIG. 1 is a diagram showing an exemplary configuration of a sensor according to a first embodiment.

FIG. 1 is a diagram showing an exemplary configuration of a sensor according to a first embodiment. The sensor 1 according to the present embodiment is, for example, a sensor that detects vibration of a rotary body. The sensor 1 comprises sensor elements 2. The sensor elements 2 are arranged two-dimensionally, for example. Each sensor element 2 comprises a piezoelectric transducer 21 and a switch 22.

The piezoelectric transducer 21 is a piezoelectric type resonant cantilever comprising a piezoelectric beam, one end of which is a free end and the other end of which is a fixed end. A beam length, etc. of each piezoelectric transducer 21 are adjusted so that the piezoelectric transducer 21 has a resonance frequency fmn. Each piezoelectric transducer 21 to generates a voltage by bending according to an external vibration of a frequency fmn. Here, m (m=1, 2, . . . ) represents a column position of the piezoelectric transducer 21. Furthermore, n (n=1, 2, . . . ) represents a row position of the piezoelectric transducer 21. All the values of resonance frequencies fmn (m=1, n=1, 2, . . . ) may be different from one another.

The switch 22 is a switch configured to be turned on by contacting the piezoelectric transducer 21 when the piezoelectric transducer 21 resonates by receiving an external vibration. The switch 22 is, for example, a CMOS switch, and outputs an output signal Smn corresponding to an output voltage of the piezoelectric transducer 21. The switch 22 may not necessarily be a CMOS switch as long as the switch can receive the output voltage generated in the piezoelectric transducer 21 by contacting the piezoelectric transducer 21. For example, the switch 22 may be configured by using an MEMS switch or the like.

Figure 2:
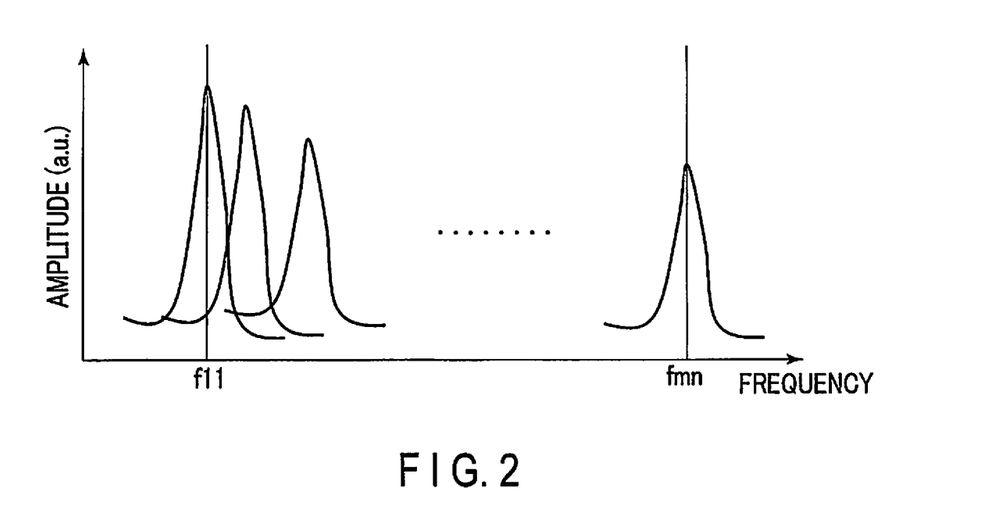
FIG. 2 is a diagram showing an example of a spectrum of vibration that can be detected by the sensor.

Next, the operation of the sensor 1 will be described. FIG. 2 is a diagram showing an example of a spectrum of vibration that can be detected by the sensor 1. As shown in FIG. 2, each piezoelectric transducer 21 of the sensor 1 has a resonance frequency in a band from f11 to fmn. In other words, the spectrum of the vibration of each piezoelectric transducer 21 has a peak at the corresponding resonance frequency.

Figure 3:
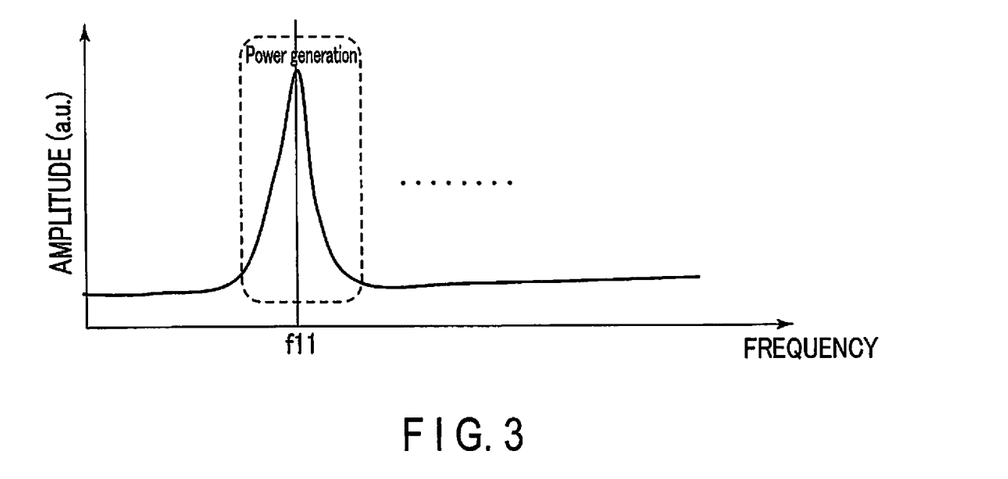
FIG. 3 is a diagram showing an example of a spectrum of vibration under steady operation of a rotary body.

FIG. 3 is a diagram showing an example of a spectrum of vibration under steady operation of the rotary body. For example, it is assumed that the rotary body vibrates at the frequency f11 under steady operation of the rotary body. When the sensor 1 receives such vibration, the piezoelectric transducer 21 having the resonance frequency f11 resonates.

Figure 4:
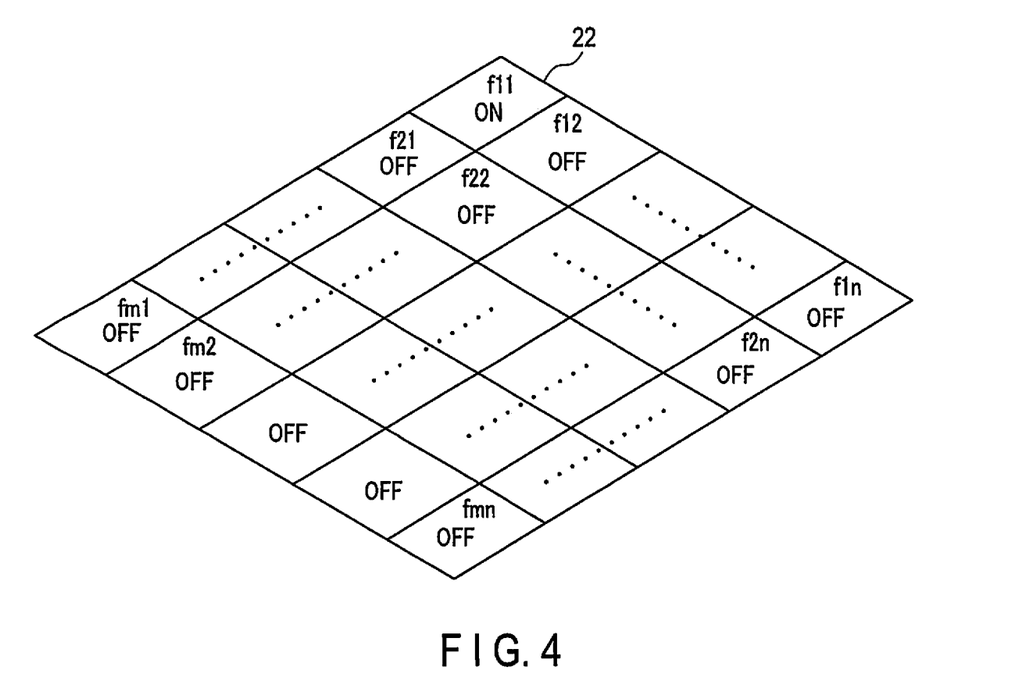
FIG. 4 is a diagram showing an on/off state of a switch under steady operation.

FIG. 4 is a diagram showing the on/off state of the switch 22 under steady operation. Since the piezoelectric transducer 21 having the resonance frequency f11 resonates under steady operation, as shown in FIG. 4, only the switch 22 corresponding to the piezoelectric transducer 21 having the resonance frequency f11 is turned on.

Here, the vibration under steady operation is not an abnormal vibration, and thus it is unnecessary to be used for evaluation of abnormal vibration. Therefore, an output signal of the sensor element 2 having the resonance frequency f11 can be used for applications other than the evaluation of abnormal vibration. In the present embodiment, the output signal of the sensor element 2 having the resonance frequency f11 may be used as a power supply voltage for circuits other than the sensor 1. In other words, under steady operation, the sensor 1 operates as a generator circuit.

Figure 5:
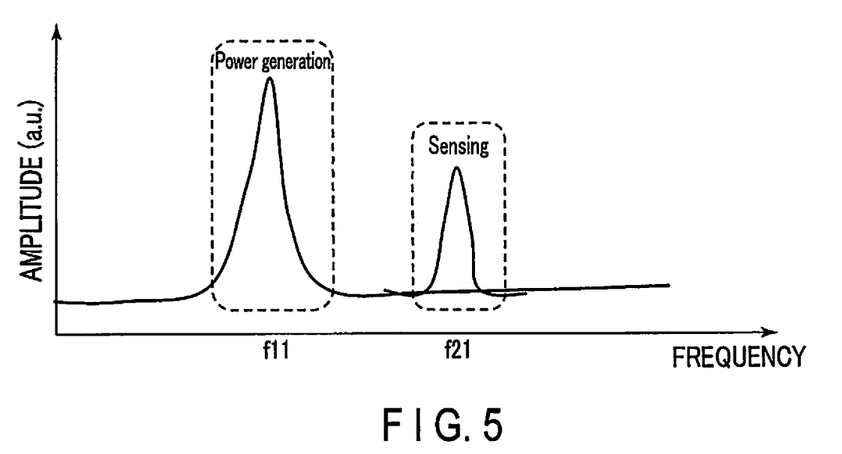
FIG. 5 is a diagram showing an example of a spectrum of vibration when abnormal vibration occurs in the rotary body.

FIG. 5 is a diagram showing an example of a spectrum of vibration when abnormal vibration occurs in the rotary body. As shown in FIG. 5, when abnormal vibration occurs in the rotary body, in addition to the piezoelectric transducer 21 having the resonance frequency f11, a piezoelectric transducer 21 having a resonance frequency close to the frequency of new vibration appearing due to the abnormal vibration, for example, a piezoelectric transducer 21 having a resonance frequency f21 also resonates.

Figure 6:
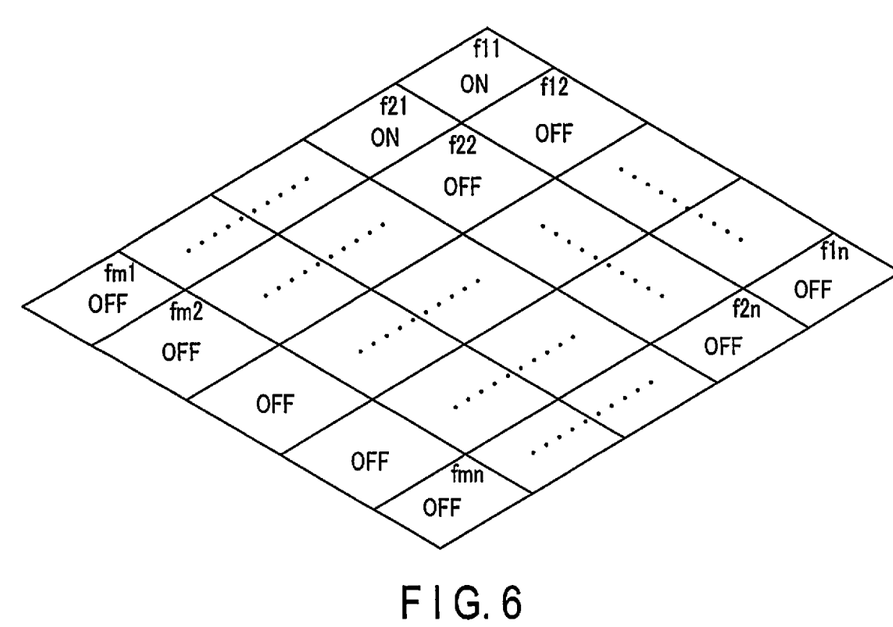
FIG. 6 is a diagram showing an on/off state of the switch when abnormal vibration occurs.

FIG. 6 is a diagram showing the on/off state of the switch 22 when abnormal vibration occurs. As shown in FIG. 6, when abnormal vibration occurs, in addition to the switch 22 corresponding to the piezoelectric transducer 21 having the resonance frequency f11, a switch 22 corresponding to a resonance frequency which corresponds to the piezoelectric transducer 21 having the frequency of the abnormal vibration, for example, the resonance frequency f21 is also turned on.

As described above, the on/off state of the switch 22 changes before and after the occurrence of the abnormal vibration. Therefore, only the signal corresponding to the abnormal vibration can be extracted from the difference between the output signal of the sensor element 2 before the generation of the abnormal vibration and the output signal of the sensor element 2 after the generation of the abnormal vibration. The evaluation of the abnormal vibration can be performed based on the signal corresponding to the abnormal vibration. The evaluation of the abnormal vibration can be performed, for example, by calculating an evaluation value indicating which frequency vibration occurs with what degree of intensity with respect to the vibration under steady operation. On the other hand, signals of remaining components other than the signal corresponding to the abnormal vibration are signals corresponding to the vibration under steady operation. The signals of the remaining components can be used for applications other than the evaluation of abnormal vibration. In an example of FIG. 6, the output signal of the sensor element 2 having the resonance frequency f21 can be used for the evaluation of abnormal vibration. On the other hand, a signal generated in the sensor element 2 of the resonance frequency f11 can be used as a power supply voltage of circuits other than the sensor 1.

Figure 7:
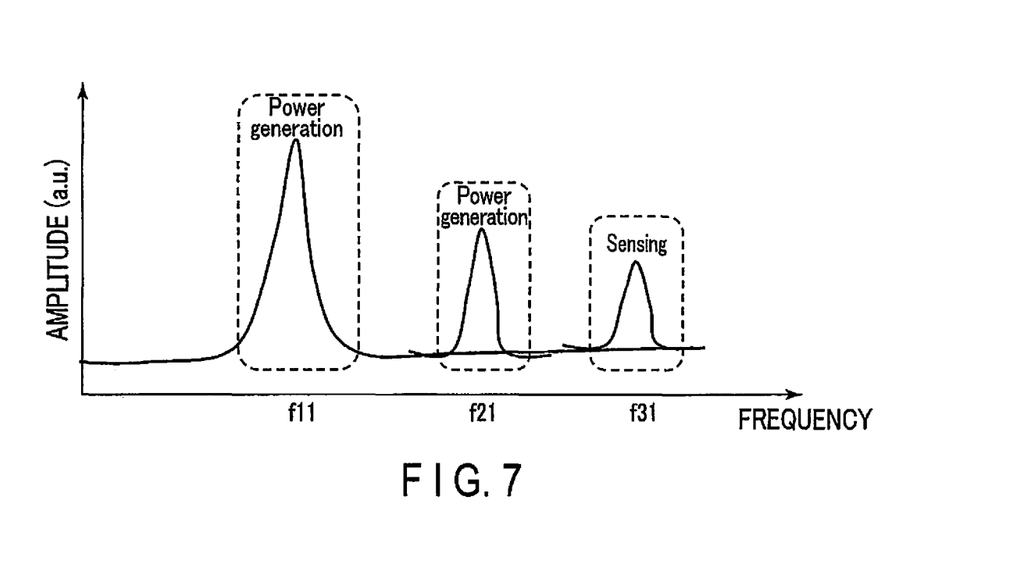
FIG. 7 is a diagram showing an example of a vibration spectrum when abnormal vibration further develops from the state of FIG. 5.

FIG. 7 is a diagram showing an example of a vibration spectrum when abnormal vibration further develops from the state of FIG. 5. When the abnormal vibration further develops, a peak of a new vibration appears as compared with FIG. 5. Therefore, in addition to the switch 22 that has been turned on before the abnormal vibration develops, another switch 22 is also turned on.

Even when the abnormal vibration develops, only the signal corresponding to the abnormal vibration after the development can be taken out from the difference between the output signal of the sensor element 2 before the development of the abnormal vibration and the output signal of the sensor element 2 after the development of the abnormal vibration. The evaluation of the abnormal vibration after the development can be performed based on the signal corresponding to the abnormal vibration after the development. The evaluation of the abnormal vibration after the development can be performed, for example, by calculating an evaluation value indicating which frequency vibration occurs with what degree of intensity with respect to the vibration before the development. The signal of the remaining components is a signal before the development of the abnormal vibration. Since the signals of the remaining components other than the signal corresponding to the abnormal vibration after the development has already been evaluated, they can be used for applications other than the evaluation of abnormal vibration.

As described above, the output signal of the sensor 1 of the present embodiment is used in any application for power generation and evaluation of abnormal vibration as the abnormal vibration occurs and develops.

Figure 8:
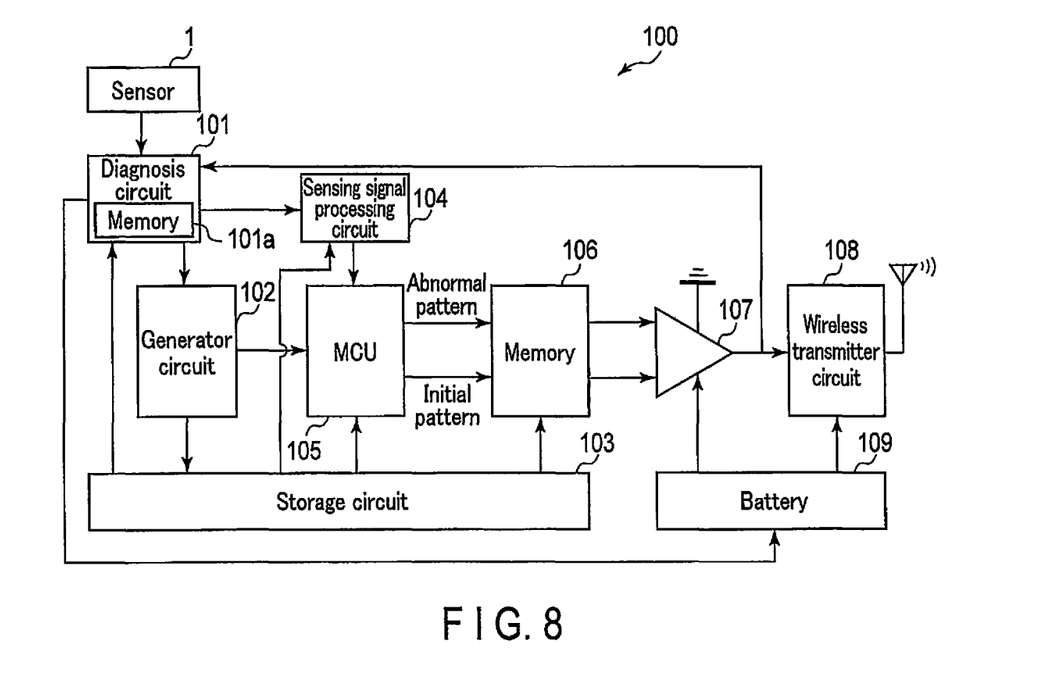
FIG. 8 is a block diagram showing an exemplary configuration of a sensor module including a sensor.

FIG. 8 is a block diagram showing an exemplary configuration of a sensor module including the sensor 1. The sensor module 100 comprises the sensor 1, a diagnosis circuit 101, a generator circuit 102, a storage circuit 103, a sensing signal processing circuit 104, a micro controller unit (MCU) 105, a memory 106, a comparison circuit 107, a wireless transmitter circuit 108, and a battery 109. The sensor module 100 is fitted to the rotary body so as to be able to receive vibration from the rotary body as a vibration detection target.

The diagnosis circuit 101 determines whether abnormal vibration has occurred or whether the abnormal vibration has developed, and switches an output destination of the output signal of the sensor 1 according to a determination result. The diagnosis circuit 101 includes a memory 101a. The memory 101a is a memory for storing an initial pattern. The initial pattern is information on the frequency and intensity of each vibration contained in vibrations of the rotary body under steady operation or vibrations of the rotary body before development of abnormal vibration. The frequency of each vibration corresponds to the resonance frequency of the corresponding sensor element 2, that is, corresponds to position information of the switch 22 to be turned on. The intensity of each vibration corresponds to the amplitude of the output signal of the corresponding sensor element 2. The memory 101a stores, for example, a vibration pattern of the rotary body under steady operation as an initial value of the initial pattern.

The diagnosis circuit 101 compares an initial pattern as a past vibration pattern with a current vibration pattern based on the current output signal of the sensor 1. Specifically, the diagnosis circuit 101 compares the difference between the output signals of the sensor element 2 at the same position. When there is no difference between the initial pattern and the current vibration pattern, the diagnosis circuit 101 diagnoses that no abnormal vibration is occurring. In this case, the diagnosis circuit 101 switches the output destination of the output signal of the sensor 1 to the generator circuit 102. Furthermore, the diagnosis circuit 101 causes the battery 109 to stop power supply to the comparison circuit 107 and the wireless transmitter circuit 108. On the other hand, when there is a difference between the initial pattern and the current vibration pattern, the diagnosis circuit 101 diagnoses that abnormal vibration is occurring. In this case, the diagnosis circuit 101 switches the output destination of the output signal of the sensor 1 to the sensing signal processing circuit 104. Furthermore, the diagnosis circuit 101 causes the battery 109 to start power supply to the comparison circuit 107 and the wireless transmitter circuit 108.

The diagnosis circuit 101 also updates the initial pattern each time a signal of a comparison result described later is input from the comparison circuit 107. Thereafter, the diagnosis circuit 101 compares an updated initial pattern with a current vibration pattern based on a current output signal of the sensor 1. When there is no difference between the updated initial pattern and the current vibration pattern, the diagnosis circuit 101 diagnoses that abnormal vibration has not developed. When there is a difference between the updated initial pattern and the current vibration pattern, the diagnosis circuit 101 diagnoses that abnormal vibration is developing. The switching of the output destination in this case is performed in the same manner as the case where abnormal vibration occurs.

The generator circuit 102 generates power necessary for the operation of each circuit of the sensor module 100 from the output signal of the sensor 1. The generator circuit 102 includes, for example, a step-up/step-down circuit. The generator circuit 102 may also have circuits other than the step-up/step-down circuit. Furthermore, the generator circuit 102 includes an A/D converter, converts the output signal of the sensor 1 into a digital signal, and outputs the digital signal to the MCU 105. At this time, the generator circuit 102 may amplify the output signal of the sensor 1 and then output the amplified signal to the MCU 105.

The storage circuit 103 stores power generated by the generator circuit 102. The storage circuit 103 is, for example, a storage circuit including a capacitor. The power stored in the storage circuit 103 is supplied as a power supply for operations of the diagnosis circuit 101, the sensing signal processing circuit 104, the MCU 105, and the memory 106.

The sensing signal processing circuit 104 outputs the output signal of the sensor 1 while executing pre-processing on the output signal of the sensor 1 so that the output signal is suitable for detection of abnormal vibration. The sensing signal processing circuit 104 converts, for example, the output signal of the sensor 1 into a digital signal and outputs the digital signal to the MCU 105. At this time, the generator circuit 102 may amplify the output signal of the sensor 1 and then output the amplified signal to the MCU 105.

The MCU 105 is an information processing circuit in which a processor such as CPU and memories such as RAM and ROM are unitized. The MCU 105 processes output signals of the generator circuit 102 and the sensing signal processing circuit 104. For example, the MCU 105 extracts a vibration pattern from the output signals of the generator circuit 102 and the sensing signal processing circuit 104. Then, the MCU 105 stores the extracted vibration pattern into the memory 106.

The memory 106 is, for example, memories such as RAM and ROM, and stores a vibration pattern. The memory 106 has a capacity enough to store vibration patterns of both the initial pattern and the abnormal pattern. The initial pattern is a vibration pattern extracted from the output signal of the generator circuit 102. The abnormal pattern is a vibration pattern extracted from the output signal of the sensing signal processing circuit 104.

The comparison circuit 107 compares the initial pattern and the abnormal vibration pattern stored in the memory 106 with each other, and outputs a comparison result to the diagnosis circuit 101 and the wireless transmitter circuit 108. The comparison circuit 107 is, for example, a differential amplifier circuit that outputs a signal corresponding to the difference between the initial pattern and the abnormal vibration pattern.

The wireless transmitter circuit 108 includes an antenna or the like, and transmits the signal corresponding to the difference between the initial pattern and the abnormal vibration pattern to, for example, an external server of the sensor module 100 upon an input of the signal of the comparison result from the comparison circuit 107 as a trigger. The method of wireless communication is not particularly limited.

The battery 109 supplies power for the operation to each circuit of the sensor module 100. At least the battery 109 is configured to be able to supply power to the comparison circuit 107 and the wireless transmitter circuit 108. The battery 109 may be configured to be able to supply power to the diagnosis circuit 101, the sensing signal processing circuit 104, the MCU 105, and the memory 106.

The operation of the sensor module 100 will be described hereunder. When the rotary body vibrates due to rotation or the like, the piezoelectric transducer 21 having a resonance frequency close to the frequency of the vibration thereof resonates. The resonance of the piezoelectric transducer 21 turns on the switch 22. As a result, an output signal corresponding to a voltage generated in the piezoelectric transducer 21 is sent to the diagnosis circuit 101.

The diagnosis circuit 101 compares the initial pattern and the current vibration pattern with each other. For example, under steady operation, the initial pattern and the current vibration pattern are substantially coincident with each other. Therefore, the diagnosis circuit 101 switches the output destination of the output signal of the sensor 1 to the generator circuit 102. Furthermore, the diagnosis circuit 101 causes the battery 109 to stop power supply to the comparison circuit 107 and the wireless transmitter circuit 108.

The generator circuit 102 generates power for the operation of each circuit from the output signal of the sensor 1. The power generated by the generator circuit 102 is stored in the storage circuit 103. The diagnosis circuit 101, the sensing signal processing circuit 104, the MCU 105, and the memory 106 operate with the power stored in the storage circuit 103. When no power is stored in the storage circuit 103, the diagnosis circuit 101, the sensing signal processing circuit 104, the MCU 105, and the memory 106 may operate with power from the battery 109.

The generator circuit 102 converts the output signal of the sensor 1 into a digital signal and outputs the digital signal to the MCU 105. The MCU 105 stores the vibration pattern extracted from the output signal of the generator circuit 102 as an initial pattern in the memory 106. The initial pattern stored in the memory 106 is updated each time the output signal of the generator circuit 102 is input to the MCU 105.

Under steady operation, no power is supplied from the battery 109 to the comparison circuit 107 and the wireless transmitter circuit 108. Therefore, the comparison circuit 107 and the wireless transmitter circuit 108 do not operate.

On the other hand, under occurrence of abnormal vibration or development of abnormal vibration, a difference caused by occurrence of vibration of a new frequency appears between the initial pattern and the current vibration pattern. Accordingly, the diagnosis circuit 101 switches the output destination of the output signal of the sensor 1 to the sensing signal processing circuit 104. The diagnosis circuit 101 causes the battery 109 to start power supply to the comparison circuit 107 and the wireless transmitter circuit 108.

The sensing signal processing circuit 104 converts the output signal of the sensor 1 into a digital signal and outputs the digital signal to the MCU 105. The MCU 105 stores the vibration pattern extracted from the output signal of the sensing signal processing circuit 104 as an abnormal pattern in the memory 106. The abnormal pattern stored in the memory 106 is updated each time the output signal of the sensing signal processing circuit 104 is input to the MCU 105.

When abnormal vibration occurs or develops, power is supplied to the comparison circuit 107 and the wireless transmitter circuit 108 from the battery 109. At this time, the comparison circuit 107 reads the vibration pattern and the abnormal pattern stored in the memory 106, and outputs a signal of a comparison result of the vibration pattern and the abnormal pattern. The wireless transmitter circuit 108 receives the signal input of the comparison result and transmits the signal of the comparison result to the server. The server evaluates the abnormal vibration in the rotary body based on the signal transmitted from the wireless transmitter circuit 108. For example, the server calculates an evaluation value indicating which frequency vibration is generated with what degree of intensity with respect to the vibration before the occurrence of the abnormal vibration. A cause of the abnormality may also be identified according to the frequency. Furthermore, when sensors 1 are attached to a plurality of locations of the rotary body, it is possible to specify a vibration-occurrence position in the server.

The output signal of the comparison circuit 107 is a signal indicating a vibration pattern after occurrence or development of abnormal vibration. Accordingly, the diagnosis circuit 101 updates the initial pattern by adding to the initial pattern the vibration pattern after occurrence or development of the abnormal vibration which is input from the comparison circuit 107. As a result, the diagnosis circuit 101 can switch the output destination of the sensor 1 as the abnormal vibration develops.

As described above, in the first embodiment, vibrations in a wide frequency band can be detected by the sensor in which a plurality of piezoelectric type resonance cantilevers having different resonance frequencies are arranged. Furthermore, the piezoelectric type resonant cantilever operates without any external power supply. In other words, power consumption of the sensor 1 is zero. Furthermore, since the sensor 1 can detect vibrations in a wide frequency band, the sensor 1 can not only detect abnormal vibration, but also perform custom handling adapted to rotary bodies having different rotational frequencies.

The power for the operation of each circuit of the sensor module 100 can be covered by power stored in the storage circuit 103 according to the vibration under steady operation and power stored in the storage circuit 103 before a new abnormal vibration occurs. Furthermore, supply of power from the battery 109 to the comparison circuit 107 and the wireless transmitter circuit 108 is performed only when abnormal vibration occurs or when abnormal vibration develops. In this manner, the life of the battery 109 can be extended, and a labor for battery replacement can be reduced.

Second Embodiment

Figure 9:
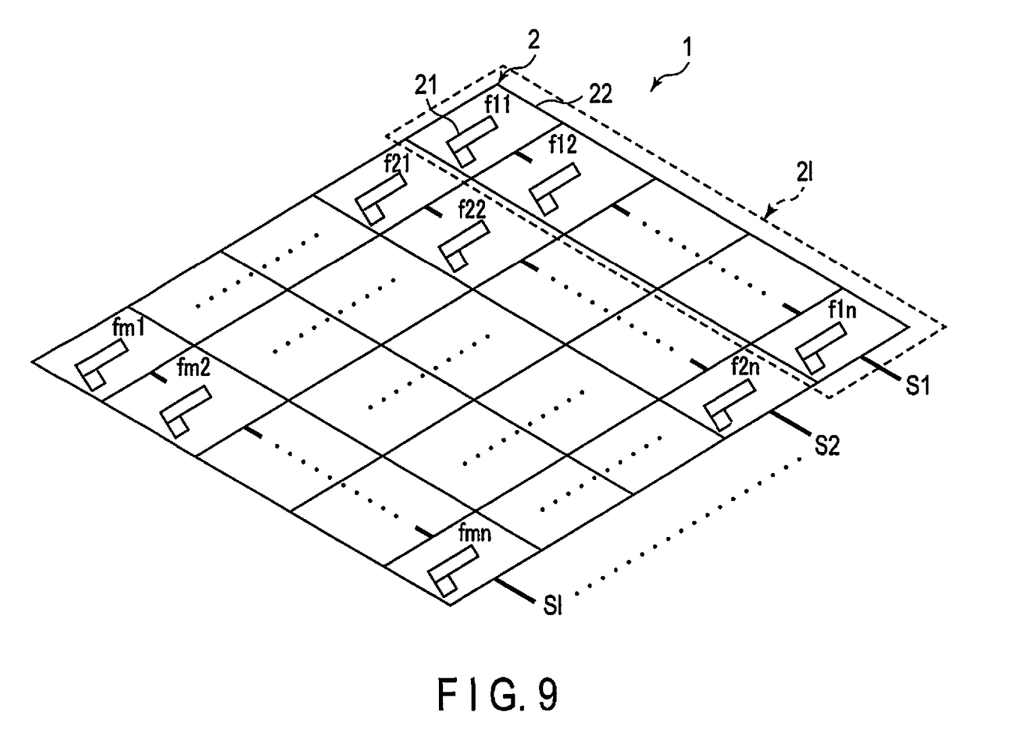
FIG. 9 is a diagram showing an exemplary configuration of a sensor according to a second embodiment.

A second embodiment will be described. FIG. 9 is a diagram showing a configuration of a sensor according to the second embodiment. The sensor 1 of the second embodiment comprises sensor elements 2 as in the case of the first embodiment. The sensor elements 2 are arranged two-dimensionally, for example. In the second embodiment, a plurality of sensor elements 2 form a sensor element array 21 (l=1, 2, 3, . . . ). Each sensor element 2 comprises a piezoelectric transducer 21 and a switch 22 as in the case of the first embodiment.

In the second embodiment, respective piezoelectric transducers 21 of one sensor element array 21 form a piezoelectric transducer array for which beam lengths and the like are adjusted so that the piezoelectric transducers 21 resonate at the same resonance frequency. For example, in FIG. 9, piezoelectric transducers 21 having the same value of m form a piezoelectric transducer array having the same value of the resonance frequency. In FIG. 9, the piezoelectric transducers 21 having the same value of n may form a piezoelectric transducer array.

In the second embodiment, the switches 22 corresponding to the respective piezoelectric transducers 21 of one sensor element array 21 are connected in series. Accordingly, one sensor element array 21 outputs an output signal S1 corresponding to the sum of output signals Smn of the respective sensor elements 2 to a diagnosis circuit 101.

When piezoelectric transducers 21 form an array, as the intensity of vibration is higher, a larger number of piezoelectric transducers 21 having resonance frequencies close to the frequency of the vibration resonate. In other words, the amplitude of a signal input to the diagnosis circuit 101 increases. As described above, in the second embodiment, by configuring the piezoelectric transducers 21 as an array and connecting the switches 22 in series, the intensity of vibration can be detected more accurately. In addition, the amount of power generation can be improved.

[Modification]

Hereinafter, modifications of the first embodiment and the second embodiment will be described. In the first and second embodiments described above, the piezoelectric transducer 21 is a piezoelectric resonance type cantilever. On the other hand, the piezoelectric transducer 21 may be a piezoelectric resonant type double-supported beam, a piezoelectric resonant type membrane, or the like instead of the cantilever. In other words, the piezoelectric transducer 21 may be configured to generate electric power by an inverse piezoelectric effect based on vibration from the outside. In FIG. 1, the shape of the switch 22, that is, the shape of the sensor element 2 is rectangular. On, the other hand, the shape of the sensor element 2 may be an arbitrary shape such as a circle or an ellipse.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor module comprising:
   a sensor comprising a plurality of piezoelectric transducers having different resonance frequencies, and a plurality of switches provided to correspond to the piezoelectric transducers, respectively, each of the switches being configured to output an output signal corresponding to a voltage generated by an inverse piezoelectric effect of a corresponding piezoelectric transducer of the piezoelectric transducers; and
   a diagnosis circuit configured to diagnose, based on a difference in pattern of the output signal, whether vibration having a new frequency has occurred in the sensor, and switch an output destination of the output signal of the sensor according to a result of the diagnosis;
   a generator circuit configured to generate power from the output signal; and
   a sensing signal processing circuit configured to generate a signal for evaluation of a newly occurring vibration from the output signal,
   wherein the diagnosis circuit switches the output destination of the output signal of the sensor to the generator circuit when diagnosing that no vibration having the new frequency has occurred in the sensor, and switches the output destination of the output signal of the sensor to the sensing signal processing circuit when diagnosing that vibration having the new frequency has occurred in the sensor.

2. The sensor module according to claim 1, further comprising:
- a storage circuit configured to store power generated by the generator circuit;
- an information processing circuit configured to process a first output signal of the sensor for which the output destination is switched to the generator circuit and a second output signal of the sensor for which the output destination is switched to the sensing signal processing circuit;
- a memory configured to store the processed first output signal and the processed second output signal; and
- a comparison circuit configured to compare the first output signal and the second output signal stored in the memory with each other.

3. The sensor module according to claim 1, wherein the plurality of piezoelectric transducers comprise cantilevers having different resonance frequencies, respectively.

4. The sensor module according to claim 1, wherein the plurality of piezoelectric transducers comprise double-supported beams having different resonance frequencies, respectively.

5. The sensor module according to claim 1, wherein the plurality of piezoelectric transducers comprise membranes having different resonance frequencies, respectively.

6. The sensor module according to claim 1, wherein the plurality of piezoelectric transducers form an array having an identical resonance frequency, and the switches corresponding to the piezoelectric transducers forming the array are connected in series.

7. The sensor module according to claim 1, wherein the diagnosis circuit is configured to store a pattern of an output signal when vibration previously occurred in the sensor,
- perform the diagnosis based on a difference between a pattern of an output signal when vibration previously occurred in the sensor and a current output signal of the sensor, and
- when diagnosing that vibration newly occurs in the sensor, update the stored pattern of the output signal when the vibration previously occurred in the sensor to a pattern of the current output signal of the sensor.

* * * * *